United States Patent Office 3,170,902
Patented Feb. 23, 1965

3,170,902
PROCESS FOR ALTERING THE PROPERTIES OF THERMOPLASTIC HALOGEN CONTAINING POLYMERS
Rudolf Nagelschmidt, Hanau am Main, Max Goecke, Bad Homburg vor der Hohe, and Heinz Kopsch, Hanau am Main, Germany, assignors to Deutsche Gold- und Silber-Scheideanstalt vormals Roessler, Frankfurt am Main, Germany
Filed Oct. 19, 1961, Ser. No. 146,205
Claims priority, application Germany, Oct. 21, 1960, D 34,588
21 Claims. (Cl. 260—92.8)

The present invention relates to a process for altering the properties of thermoplastic halogen containing polymers, such as, for example, decreasing plastic flow under pressure, decreasing or eliminating the thermoplasticity thereof upon heating, improving their stability against heat, light, chemicals, weathering and the like.

Many attempts have already been made to eliminate the thermoplasticity of halogen containing thermoplastic polymers. The processes, however, which have previously become known have not led to practically usable products and have achieved only slight significance.

One proposal, for example, is to treat a copolymer of vinyl chloride (75%–90%) and vinylidene chloride (25%–10%) with hexamethylene-ammonium-hexamethylene-dithiocarbamate. In addition to such salt of cyclohexyl amine and the cyclohexyl derivative of the organic dithiocarbamic acid, salts having various other primary, secondary or tertiary monoamines as the basic component and mono- and dibasic organic acids as the acid components were also suggested in such proposal. While the products produced exhibit a decreased thermoplastic flow they are rather unstable. This is evidenced by a strong brownish or still darker discoloration when such products are subjected to ageing as would be expected in use.

It is also known that alkylene polyamines of the general formula $H_2-N-(CR_2-CR_2-NH)_n-H$ can be permitted to act on resins based on polyvinyl and polyvinylidene chloride. These products, however, also undergo strong discoloration on ageing. Furthermore, the velocity of the reaction when pure polyamines are employed is so great that there are only relatively few processing methods which are of limited application.

It is furthermore known that a synthetic rubber like product can be produced by vulcanization of a copolymer of a major proportion of acrylic acid ester and a very minor proportion of a vinyl or halogen containing monomer with various vulcanization systems. Sulfur and known vulcanization accelerators and also quinone derivatives, dinitrobenzene, peroxides, as well as amines, such as triethylene tetramine or triethyl trimethylene triamine, and amino condensation products have been suggested as the vulcanization agents. The vulcanized products thus obtained in no way meet the requirements of the practice whether from the point of view of fabrication or with a view to their chemical and thermal stability.

The treatment of halogen containing polymers or copolymers, such as polyvinyl chloride, polyvinylidene chloride or polyvinylidene fluoride, or their copolymers with condensation products of aliphatic aldehydes and aromatic amines which are monofunctional or with sulfur containing compounds, such as thiuram-mono-, -di- and -tetra-sulfide or with urea, thiourea, guanidine and the like is also known. The polymers or copolymers thus treated are then spun to fibers which during their further processing are oriented by stretching. This proposal which only is indicated to be applicable to oriented fibers and according to which the degree of heat shrinkage of the fibers is to be decreased is fundamentally different from the process according to the invention in many ways.

It is also already known that the properties of polyvinyl chloride or its copolymers can be altered by treatment with nitrogen bases and metals or metal compounds as catalysts, if desired, in the presence of sulfur compounds, at elevated temperatures. The products obtained, however, still exhibit a rather high thermoplasticity (even though at relatively high temperatures) in comparison to the untreated polymers and the rubber like elastic properties are substantially different from those of natural and synthetic rubber.

Another known process for the stabilization of high molecular weight substances employs ethyleneimine derivatives, the nitrogen of which is bound to phosphorus over an amide like linkage. The derivatives concerned are monofunctional amides of phosphoric acid.

According to the invention it was unexpectedly found that the properties of masses and shaped bodies of thermoplastic halogen containing polymers and copolymers and polymer mixtures containing one or more components derived from monomers producing thermoplastic halogen containing homopolymers can be altered in a desirable manner if these polymers, in essence, are reacted with the reaction products (A) of at least one monomeric or polymeric phosphorous acid ($A_1$) including the acids of phosphorus equivalent thereto and including their semi esters or partial esters with mono or polyhydric alcohols containing up to 18 carbon atoms and a di- or polyamine ($A_2$) having at least two amino nitrogen atoms each carrying at least one hydrogen atom, if desired, together with at least one non-hardenable organic compound (B) containing one or more epoxy groups and/or one or more metal oxides (C) of metals having a valency of at least 2 and/or metal salts (D) of metals having a valency of at least 2 with the primary reaction products (A). Said metal ammonium salts (D) need not be employed in combination with reaction products (A) but can also be used by themselves to react with the polymers indicated and improve their properties. In addition, it is also possible to use the starting substances of reaction products (A) to treat such polymers. Also, solutions of reaction products (A), of their starting substances ($A_1+A_2$) or of metal ammonium salts (D) can be employed to treat preshaped polymers of the type concerned.

The action of the compounds on the thermoplastic halogen containing polymers is dependent upon the type of compound added, as will be explained more fully in the following. In most instances the measure employed according to the invention completely or partially eliminate the thermoplastic properties of such polymers. At the same time the disadvantages with regard to stability, which were observed with previously known processes, do not occur. Among the compounds indicated above there are some which, while not having a very pronounced effect on lowering the plasticity of the polymers, have an intensified stabilizing action. Very often when the compounds employed according to the invention are used in combination with the other substances mentioned, such as epoxides or certain metal oxides, a synergistic action occurs whereby a complete elimination of plasticity is effected with a simultaneous increase in stability, an effect which previously has never been observed or described. Polymers which have been thus treated with regard to their stability are at least equal to and in most instances surpass polymers which merely have been treated in the usual manner with one of the known stabilizers.

The halogen containing polymers which can be treated according to the invention, for example, are: polyvinyl chloride, polyvinylidene chloride, polyvinyl bromopropionate, polychloroethyl acrylate, polybromoethyl acrylate, poly-α-chlorostyrene, halogen containing natural and synthetic rubbers, such as chlorinated rubber, rubber hydrochloride, polychloroprene, chlorosulfonated polyethylene, chlorosulfonated polypropylene, chlorinated butyl rubber, polydi - (chloromethyl) - cyclooxybutane, polytrifluorochloroethylene, polymeric mixtures of the above polymers and the corresponding copolymers, such as those of vinylidene fluoride and hexafluoropropylene or all copolymers of monomers forming the above mentioned polymers with compounds containing a reactive carbon to carbon double bond. Homopolymers and copolymers of vinyl chloride are the most important technically and commercially and as a consequence a large number of the examples relate to such polymers.

Among the phosphorous acids employable according to the invention, phosphorous or orthophosphorous acid ($H_3PO_3$) is of primary significance. However, phosphenous acid ($HPO_2$) and pyrophosphorous acid ($H_4P_2O_5$) and polymeric acids, such as diphosphorous acid ($H_4P_2O_5$) can be used. In addition, hypophosphoric acid ($H_2PO_3$) and dihypophosphoric acid ($H_4P_2O_6$) can be used. Furthermore, mixtures of the types of phosphorous acids indicated with other oxy acids of phosphorus of higher or lower valency, such as diphosphoric (III, IV) acid ($H_4P_2O_6$) and hypophosphorous acid ($H_3PO_2$), the polymeric acids of phosphorus and the like can be used. With regard to phosphorous acids which can be used according to the invention see J. R. van Wazer, "Phosphorus and its Compounds," vol. 1, New York, 1958, Interscience Publishers.

The reaction products of di- or polyamines with phosphorous acids which are suitable for acting upon thermoplastic halogen containing polymers according to the invention are those of di- or polyamines containing at least two amino groups whose nitrogen atom still carries a reactive hydrogen atom. Examples of suitable diamines which can be employed alone or in admixture, for example, are: ethylene diamine, propylene diamines, butylene diamines, hexamethylene diamines, octamethylene diamines and all diamines with a chain length of up to 18 carbon atoms which in addition to hydrogen can also carry aliphatic, aromatic, aralipathic, cycloaliphatic or corresponding heterocyclic groups. The carbon atoms can also be bonded to oxygen, sulfur, nitrogen or phosphorus atoms or the carbon chain may be interrupted by such heteroatoms. Furthermore, such heteroatoms may be parts of other groupings as in —OH, CN, $SO_3H$, $SO_3Me$ (Me= metal), groups and the like. The carbon atom chain furthermore can be replaced partially or entirely by aromatic, aralipathic, cycloaliphatic or heterocyclic radicals. Compounds of the type indicated with the chain lengths, substituents and heteroatoms mentioned are relatively easy to produce and therefore are easily available. The substituents with or without heteroatoms in the chain and the chain lengths are not decisively important for the process according to the invention. Decisive are the type and number of reactive groups which are capable of reacting with the polymers treated therewith. Diamines of this type, for example, are benzidine, piperazine, melamine derivatives, N,N' - dipropionitrile - ethylene diamine, p-phenylene diamine, 3,4-dihydroxy-hexamethylene diamine.

Polyamines containing more than two amino groups suitable for the purposes of the invention, for example, are: diethylene triamine, dipropylene triamine, tetraethylene pentamine, N-ethyl diethylene triamine, N,N',N''-triethyl dipropylene triamine.

The following reaction products of phosphorous acids with di- or polyamines come into consideration for the process according to the invention: neutral, acid or basic salts, as well as the amides which are produced in a known manner by dehydration of the salts, as well as those compounds which carry a group as well as a group on the phosphorus atom, that is, transition compounds which contain the structural element wherein R', R'', R''' and R'''' can be the same or different and signify an alkyl radical containing 2–18 carbon atoms in a straight or branched chain, an aryl, aralkyl or cycloalkyl radical or a corresponding radical containing a heteroatom, said structural element being present at least twice in each compound.

The salts, however, also can be produced like the amides from the semi esters of phosphorous acid. In the semi or partial esters of the general formulae R can be the radical of a mono- or polyhydric alcohol containing up to 18 carbon atoms in a straight or branched chain which also can be interrupted or substituted by heteroatoms, especially oxygen, sulfur, nitrogen and phosphorus, or be any desired organic radical. The radical R can also carry a plurality of phosphorous acid groups, for example, corresponding to the general formula Poly phosphorous acid compounds, such as diphosphorous acid, can also be used. The compounds of hypophosphoric acid with di- or polyamines are also suited for, as is known, hypophosphoric acid disproportionates under suitable conditions into phosphorous and phosphoric acids.

The production of the reaction products of the phosphorous acids with di- or polyamines which according to the invention are suitable for addition to halogen containing thermoplastic polymers are prepared by methods known per se. For example, the neutral salt can be prepared from phosphorous acid and hexamethylene diamine by dissolving molar quantities of the starting substances, separating in methanol and slowly uniting the solutions. The corresponding salt crystallizes out of the solution.

Those compounds which are produced by dehydration of the corresponding ammonium salts and which contain either one or two amino groups are prepared from the salts by cycling out the water with inert solvents or from phosphorus trichloride. Processes for the production of the semi esters are equally well known. The production of the salts and the corresponding amides of the semi esters is carried out by analogous methods.

Instead of using the reaction products of phosphorous acids and di- or polyamines, one or several of the phosphorous acids or their partial esters and the di- and/or polyamines and, if desired, the metal oxides and/or the epoxides can be incorporated in the thermoplastic halogen containing polymers together or in any desired sequence.

What chemical reactions occur upon incorporation of the reaction products or the individual components thereof in thermoplastic halogen containing polymers according to the invention has not been exactly ascertained or proved. That a reaction occurs, which evidently is a cross-linking reaction, can be demonstrated by several methods. For example, torsion oscillation tests and tests on the Brabender plastograph give positive results.

The chemical effectiveness of the various acid, neutral and basic salts obtained from the phosphorous acids and the di- or polyamines, as well as of the metal salts, of the amides, of the semi amides and of the ester ammonium salts is often very different. In general, the acid compounds when used alone essentially exert a stabilizing action on the halogen containing polymers, whereas the secondary and basic phosphites also more or less strongly affect the thermoplastic properties. However, when the acid compounds are used in conjunction with non-hardenable epoxy group containing compounds and/or with metal oxides and/or metal salts of the primary compound of the reaction products of the phosphorous acids and the di- or polyamines they no longer merely have a stabilizing action but also affect the thermoplastic properties of the halogen containing thermoplastic polymers. The additional use of the non-hardenable epoxy group containing compounds and/or the metal oxides and/or metal salts of the primary compound of the reaction products of the phosphorous acids and the di- or polyamines especially reduces the reaction period between the phosphites of the di- or polyamines and the halogen containing polymers. This behavior is especially surprising as it was previously assumed that the di- and polyamine compounds would more readily react with the epoxides than with the halogen containing thermoplastic polymers, especially as it is generally known that di- or polyamines are used as curing or hardening agents for polyfunctional epoxides. It was, however, found, contrary to all expectations, that an acceleration of the reaction between the halogen containing thermoplastic polymers and the reaction products of the phosphorous acids and the di- and polyamines also occurs under the influence of monofunctional epoxides. Whether and to what extent a synergism or a catalysis occurs could as yet not be clarified.

Epoxides which are available for the reaction, for example, are: isooctyl-9,10-epoxy stearate, 3,4-epoxy-cyclohexane carboxylic acid-2-ethyl-hexyl ester, butyl epoxy stearate, decyl - epoxy-tetrahydrophthalate, allylepoxy stearate, 2-ethyl-hexyl-epoxy-tallate, epoxidized soya bean oil and similar compounds. Also, the addition of metal oxides and/or metal salts of the primary compounds of the reaction products of the phosphorous acids and the di- or polyamines promotes and accelerates the reaction according to the invention for altering or improving the properties of the halogen containing thermoplastic polymers. With reference to the two last classes of compounds of di- or polyvalent metals which have proved suitable for the purposes of the invention, the compounds of magnesium, calcium, zinc, aluminum, tin, lead, titanium, cadmium and iron have proved especially advantageous. The sequence of the metals named is not intended to be any indication of their rank of value in their use in the process according to the invention.

As indicated above, it can be of advantage if the metals are already bound in a salt like compound with the reaction products of the phosphorous acids and the di- or polyamines. These di- or polyammonium salts of the phosphorous acids can be characterized by the presence of the following element twice in each molecule:

in which R is an alkyl radical with 2 to 18 carbon atoms in a straight or branched chain, an aralkyl radical, a cycloalkyl radical or corresponding radicals containing heteroatoms. $Me^{II}$ is one-half of an equivalent of a bivalent metal, $Me^{III}$ is one-third of an equivalent of a trivalent metal, $Me^{IV}$ is one-fourth the equivalent of a quadrivalent radical and so on. The same is analogously true for the corresponding amides.

The quantities of the salts of the phosphorous acids and the di- or polyamines as well as the corresponding amides to be added to the halogen containing thermoplastic polymers can vary within wide limits. They can, for example, amount to 0.01 to 22%, preferably 0.5 to 12%, with reference to the halogen containing thermoplastic polymers. The quantities of the salts or amides derived from the semi ester of the phosphorous acids can vary within a wide range. Depending upon the size of the ester radical, they can be added in amounts of 1% to 50% with reference to the halogen containing thermoplastic polymers. Preferably, however, quantities between 4% and 25% are used in most instances.

The quantity of the di- (or poly-) ammonium metal phosphites to be added in general amounts to 0.1 to 25%, preferably 0.5 to 15%, with reference to the halogen containing thermoplastic polymers.

The non-hardening epoxy group containing compounds can be added in amounts up to 150% based upon the halogen containing thermoplastic polymers. Molar ratios are given preference. The oxides are also preferably used in molar ratios but it is also possible to add smaller or larger quantities. The quantity of the oxides employed can be up to 100% based upon the halogen containing thermoplastic polymers.

The properties and especially the mechanical properties of the thermoplastic halogen containing polymers can be varied to a far reaching degree depending upon the type and quantity of the compounds added thereto according to the invention. For example, their thermoplastic properties can be eliminated completely and the polymer converted to an elastic rubber like, a hard or a leather like state. However, a certain thermoplasticity may still be retained even though the polymer has been converted to an elastic rubber like or hard form so that the possibility of welding the polymer is retained. Depending upon the desire it is possible to provide any transitional state between the ranges of properties indicated.

A further possibility of modifying the properties of the polymeric compositions produced according to the invention resides in the co-use of compounds or combinations of compounds suggested in French Patents 1,239,-481 and 1,237,962. Such patents relate to the use of the following types of effective compounds: reaction products of di- and polyamines with ketones or aldehydes, reaction products of nitroso compounds with compounds containing at least one methylene group containing active hydrogen atoms, such compounds being either used alone or in combination with sulfur or sulfur containing organic compounds.

It furthermore was found that the co-use of compounds according to Belgian Patent 586,583 also can be of advantage. The compounds concerned in such patent are methylols derived from di- and polyamines or amides. For some applications it also can be of advantage to use the combination described in Belgian Patent 588,271 in conjunction with the compounds employed according to the invention. The combinations described in such patent consist of compounds containing at least two groups in a non-cyclic bond and/or a dimethylol compound in combination with an isocyanate.

A further refinement of the process according to the invention resides in adding known stabilizers for halogen containing polymers, such as metal soaps and organic tin compounds, to the halogen containing thermoplastic polymers in addition to the indicated reaction products or salts or phosphorous acids. For special fields of application, the addition of known stabilizers may be necessary. Such known stabilizers, for example, are barium-cadmium laurate, basic lead stearate, barium ricinoleate, dibutyl tin laurate, dibutyl tin mercaptide, dibutyl tin maleate, barium-cadmium complex compounds, tribasic lead maleate, UV absorbers, such as 2,2'-dihydroxy-4-methoxybenzophenone and other benzophenone derivatives, salicylic acid derivatives, such as phenyl salicylate and others. The quantity of such additional stabilizers which may be used in general can be between 0.01 and 2.5% based upon the thermoplastic halogen containing polymer and depends upon the specific stabilizer employed.

Finally it was found that it often can be advantageous also to add fillers, coloring materials, pigments, plasticizers and/or lubricants to the halogen containing thermoplastic polymer in addition to the compounds derived from phosphorous acids.

The fillers, coloring materials and the like can be added in quantities of 0.1 to 150%, preferably 10 to 75%, based upon the halogen containing polymer. All types of carbon black, such as flame black, coloring black or gas black, are suited as fillers. Good results are obtained with the highly dispersed and/or aftertreated, for example, afteroxidized carbon blacks. It is also of advantage to employ precipitated white fillers, such as highly dispersed silica, titanium dioxide, aluminum oxide, iron oxide, zirconium oxide and the like. Also, finely divided chalk, mica and iron oxide can be used successfully. Preferably, however, such finely divided oxides of metals or metalloids are employed which are produced by the oxidation or hydrolytic decomposition of volatile compounds of such metals or metalloids in the gas phase at elevated temperatures. Also, mixed oxides or oxide mixtures as well as aftertreated fillers, for example, to provide suitable coatings on the particles, again preferably highly disperse oxide particles, can be employed.

The pigments and coloring material which can be used are known per se, for example, from the processing of polyvinyl chloride or chlorobutyl rubber.

The simultaneous addition of fibrous materials, such as textile fibers, glass fibers and the like, to the halogen containing polymers also can be of advantage.

The addition of plasticizers can be varied to a far reaching degree both with regard to the type of plasticizer and the quantity used. The quantity added depends upon the type of halogen containing thermoplastic polymer, the type of plasticizers and the desired degree of softness of the end product. The process according to the invention can, however, be used and processed without plasticizers.

The usual lubricants, such as glycerine, silicone oils, fats, oils, fatty alcohol sulfates, soaps, as well as inorganic materials, such as mica, talc and the like, can be employed as lubricants.

The process according to the invention is effected using customary processing procedures. For example, a halogen containing thermoplastic polymer can be dispersed in a plasticizer and stirred into a paste. The fillers or pigments and a derivative of phosphorous acid and, if desired, other materials, such as described above, admixed therewith. The mixing can be effected in a kneader, stirring apparatus, three roll mill or the like.

In order to effect the necessary reaction the masses are treated at elevated temperatures. The height of the temperature or temperature range used depends upon the type of starting polymer employed, the quantity and reactivity of the reaction agent and the desired properties to be produced in the resulting altered polymer. For most thermoplastic halogen containing polymers temperatures between 80 and 250° C., preferably between 100 and 215° C., are used. The duration of the heat treatment depends upon the temperature used, as well as the type of starting polymer, the type and reactivity of the reaction agent and the desired properties to be produced in the resulting altered polymer. The heat treatment can be of only a few minutes duration and in general should not be longer than 60 minutes and in no case should be longer than 2 hours.

The mixture produced is, for example, drawn out at elevated temperatures to a sheet on a calender. The reaction can therefore also advantageously be carried out with the mass under tension or while the mass is being stretched. However, it is also possible to process the paste with a plate press to plates or other shaped bodies at elevated temperatures. The mixture can also be applied on a web with a coating machine. When an extruder or a screw press is employed, it can be expedient to pregel and granulate the mass before processing in such a machine. In the case of some halogen containing polymers it may be significant to work in all additions on a roll mill. It also can be expedient to dissolve or suspend the halogen containing polymers to be treated according to the invention in organic solvents or solvent mixtures together with the other additions and employ such solutions or suspensions to coat various substrates, such as, for example, by spraying, dipping, brushing and the like, and after evaporation of the solvent subject the coated object to the heat treatment.

For some applications it is of advantage to carry out the working in of the reaction products or salts of the phosphorous acids or their individual components or also the heat treatment of the thermoplastic halogen containing polymers after such additions have been incorporated therein while stretching under tension. Such processing under tension is especially expedient in the production of filaments, foils and the like.

The incorporation of the additions in mixtures containing substantially no plasticizers is also possible in homogenizing apparatus suitable for the purpose. In such modification, the process according to the invention can be carried out in two steps in which a granulate is first formed at a temperature somewhat lower than the subsequent processing temperature and the processing to shaped bodies is effected in a second step at higher temperatures. Depending upon the type of polymer it often has been found expedient to work with a two or multi step heating cycle whereby it may be of advantage to carry out the heating in the first step under pressure.

It is also possible, although not very advantageous in view of the difficulties in dosage control, to treat finished shaped bodies of the halogen containing thermoplastic polymers, such as plates, foils, tubes and the like, with solutions of the reaction products or salts of the phosphorous acids in solvents or solvent mixtures by spraying such bodies with or dipping them in such solutions and subsequently subjecting them to a heat treatment.

The process according to the invention can also be employed in the production of hard or elastic foamed products by incorporating known blowing agents, such as benzene sulfohydrazide, in quantities between about 3 and 20% in the halogen containing thermoplastic polymer masses in addition to the additives employed according to the invention. For this purpose the blowing agents preferably are, if possible, incorporated last in the finished paste of the polymers, plasticizers, reaction agents and, if desired, fillers, pigments, stabilizers, lubricants and the like. The resulting paste is then introduced into molds and then processed in the usual way by the high pressure or low pressure process or processed with free heating. The formation of the foam begins with the decomposition of the blowing agent. Such decomposition temperature should be lower than the reaction temperature of the reaction agents added to alter the properties of the halogen containing thermoplastic polymer. The reaction according to the invention between the reaction agent and the polymer is then caused to proceed after formation of the foam by raising the temperature. After cooling the foam can, if desired, be given an aftertreatment at 60–120° C. The foamed materials produced according to the invention exhibit an increased elasticity and rigidity. A special advantage of the process according to the invention is that the foamed products can be produced and provided with a foil of the same polymer or same starting polymer in one step.

The following examples will serve to illustrate several embodiments of the invention. In such examples the proportions are given in parts or percent by weight unless otherwise specified.

EXAMPLE 1

A mass for the production of plates of the following composition was homogeneously mixed in a mixer:

| | Parts |
|---|---|
| Polyvinyl chloride (suspension polymer) | 50 |
| Dioctyl adipate | 40 |
| Butyl epoxy stearate | 10 |
| Iron oxide pigment | 4.5 |
| Tribasic lead maleate | 0.5 |
| Secondary dipropylene-triammonium phosphite | 5.0 |

This mass was pre-gelled and then placed in a mold and pressed and heated for 8 minutes at 180° C. and a pressure of 25 kg./cm.$^2$. After cooling, the properties of such shaped mass were compared with those of a control mass prepared without addition of the secondary dipropylene-triammonium phosphite. The following comparative values were found:

| | With Phosphite | Control Without Phosphite |
|---|---|---|
| Tearing strength kg./cm.$^2$ on 1 mm. sheet according to DIN 53504 | 121 | 70.1 |
| Elongation on break in percent according to DIN 52504 | 395 | 305 |
| Modulus 300% in kg./cm.$^2$ according to DIN 53504 | 92.2 | 84 |
| Shore hardness according to DIN 53505 | 58/56 | 55 |
| Rebound elasticity according to Shob in percent according to DIN 53512 shaped bodies | 34 | 24 |
| Cold test according to Meissner at 40° C., number of bends before break | 12,800 | 980 |

An investigation with the torsion oscillation test according to DIN 53445 makes the effect of the secondary dipropylene-triammonium phosphite on the polyvinyl chloride composition according to this example clear.

Figure 1:
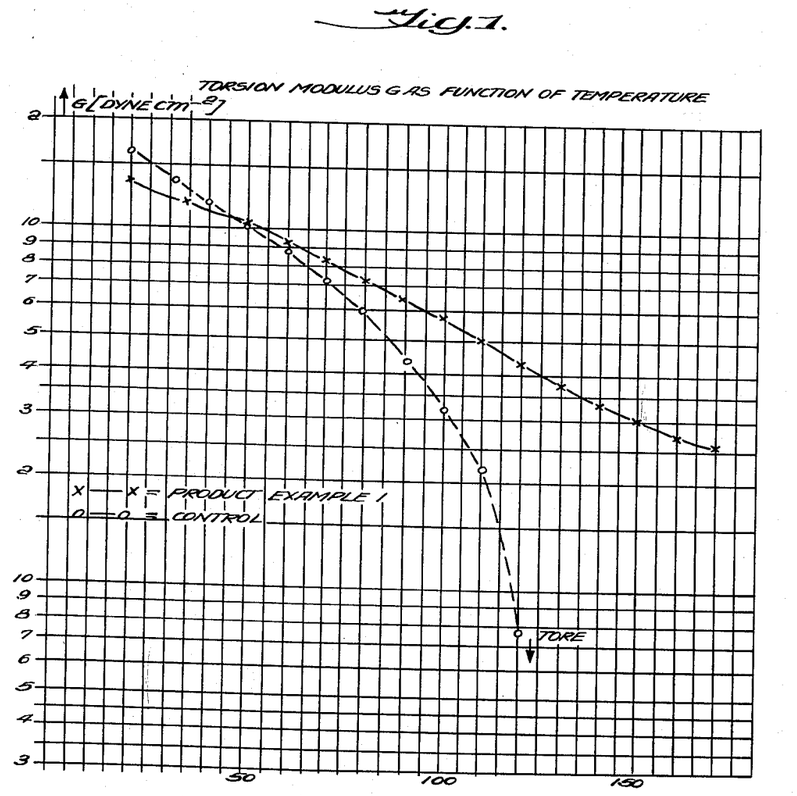

The graph shown in FIG. 1 of the drawing illustrates the dependency of the torsion modulus (G) on the temperature of the composition according to the example with the phosphite addition and of the control composition without phosphite addition.

EXAMPLE 2

A mass of the following composition which was suited for the production of profiled parts requiring good elasticity was prepared.

| | Parts |
|---|---|
| Polyvinyl chloride | 55 |
| Dioctyl phthalate | 45 |
| Talc | 5 |
| Pigment | 2 |
| Hexamethylene-diammonium phosphate | 5 |
| Paraffin | 0.2 |

The shaped mass was heated to 195° C. for about 7 minutes to effect the reaction according to the invention. The improvement in elasticity becomes evident upon investigation of the rebound elasticity and the torsion modulus.

The following values were found for the rebound elasticity according to DIN 53512.

Heat treated masses containing phosphite:

At −20° C.=20%
At +20° C.=37%
At +60° C.=42%

Heat treated control masses without phosphite:

At −20° C.=14%
At +20° C.=12.8%
At +60° C.=29%

Figure 2:
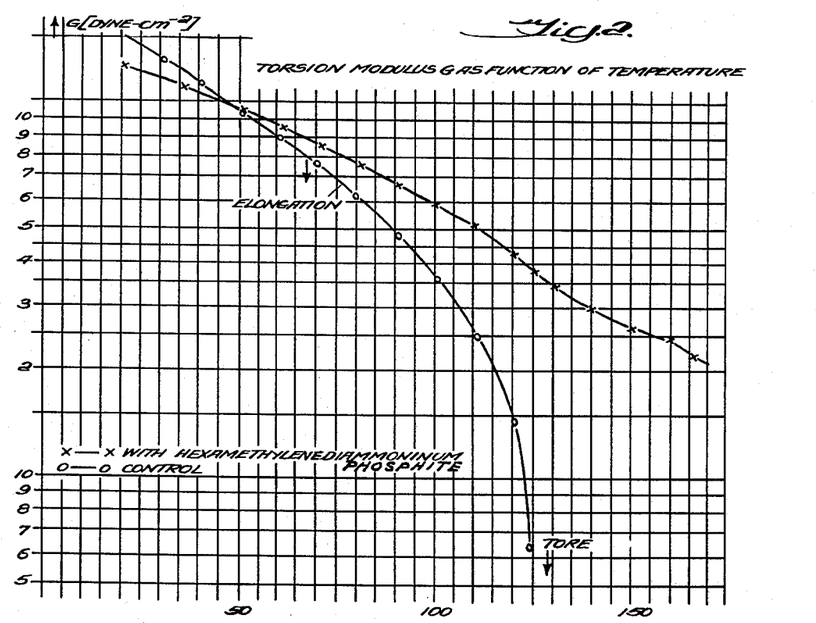

The graph shown in FIG. 2 of the drawing illustrates the dependency of the torsion modulus G on the temperature of the composition according to this example with the phosphite and of the control composition without the phosphite (torsion oscillation test according to DIN 53445).

EXAMPLE 3

A paste A of the following composition:

| | Parts |
|---|---|
| Polyvinyl chloride | 60 |
| Dioctyl phthalate | 38 |
| Butyl epoxy stearate | 2 |
| Bis-dibutyl tin mercaptide | 1 |
| Finely divided silica produced in gas phase reaction ("Aerosil," "Cabosil") | 2.5 |
| Mica flour | 7.5 |
| Pigment | 2.0 |
| Magnesia | 1.1 |
| Schiff's base from dioxoacetophenone and dipropylene triamine | 0.4 |
| Primary 1,3-propylene-diammonium phosphite | 1.8 | was painted on a carrier band and a paste B of the following composition:

| | Parts |
|---|---|
| Polyvinyl chloride | 50 |
| Dioctyl adipate | 30 |
| Dinonyl phthalate | 15 |
| Butyl epoxy palmitate | 5 |
| Dibutyl tin maleate | 1 |
| Magnesia | 2 |
| Toluene disulfohydrazide | 9 |
| N,N'-diethyl-N,N',N''-trimethylol dipropylene triamine | 0.6 |
| Dibenzal hexamethylene diamine | 0.4 |
| Basic hexamethylene-diammonium phosphite | 0.3 | applied thereover while the first coating was still wet. The band which was coated with these masses was passed through a heating tube wherein it was heated to continuously rising temperatures of 120 to 205° C. in a period of 14 minutes. An elastic foam was thereby produced from paste B which was firmly bound to mass A. The material is suitable for upholstering or similar applications as the foam had excellent elastic properties.

The above examples were carried out with polyvinyl chloride as the polymer whose properties were decisively altered and improved. Further examples with polyvinyl chloride and other halogen containing polymers are summarized in the following tabulations. The masses of the examples given in the tables can be used for the production of most varied technical products as can be understood from the above disclosures. It is particularly to be pointed out that the masses produced according to the invention, particularly those of polyvinyl chloride or copolymers of polyvinyl chloride, have become insoluble in a solvent mixture of tetrahydrofurane and methyl ethyl ketone or cyclohexanone. Such solvent mixture notoriously is an especially good solvent for polyvinyl chloride and its copolymers. In addition to the torsion modulus at temperatures in the range of 70 to 180° C. is increased 400 to 900 dynes×cm.$^{-2}$. In addition the stability against heat and light as well as the tear strength of the treated polymers is substantially better than that of the starting polymers.

Table 1 shows a compilation of the primary and secondary phosphites of di- and polyamines used which were tested for their effectiveness on an 80:20 polyvinyl chloride/plasticizer mixture. The polyvinyl chloride was an emulsion polymer having a K value of 70. Table 1 is supplemented in the graphs shown in FIGS. 3–5 of the drawings obtained with a Brabender plastograph.

Table 1

| Example No. | Phosphite added | Quantity in percent based on PVC [1] |
|---|---|---|
| 4 | Sec.-1,3-propylenediammoniumphosphite | 5 |
| 5 | Sec. hexamethylenediammoniumphosphite | 6.34 |
| 6 | Sec. dipropylenetriammoniumphosphite | 5.55 |
| 7 | Prim.-1,3-propylenediammoniumphosphite | 7.62 |
| 8 | Prim. hexamethylenediammoniumphosphite | 8.97 |
| 9 | Prim. dipropylenetriammoniumphosphite | 8.09 |
| 10 | Mixture of 80 parts prim. and 20 parts sec. tetraethylenepentammoniumphosphite | 7.67 |
| 11 | (Control) | |

[1] PVC = polyvinyl chloride.

Table 2 shows a compilation of examples using the same polyvinyl chloride/plasticizer composition and various phosphites as in the examples tabulated in Table 1 but in this instance with various additions of metal oxides to show the activating action of such oxides. Table 2 also is supplemented in the graphs shown in FIGS. 3–5 of the drawings.

Table 2

| Example No. | Phosphite added | Quantity in percent based on PVC | Metal Oxide | Quantity of Metal Oxide |
|---|---|---|---|---|
| 12 | Sec.-1,3-propylenediammoniumphosphite | 5.0 | Magnesium | 1.28 |
| 13 | ----do---- | 5.0 | Aluminum | 1.63 |
| 14 | ----do---- | 5.0 | Iron | 9.65 |
| 15 | ----do---- | 5.0 | Lead | 7.08 |
| 16 | Prim.-1,3-propylenediammoniumphosphite | 7.62 | Magnesium | 2.56 |
| 17 | ----do---- | 7.62 | Aluminum | 3.26 |
| 18 | ----do---- | 7.62 | Iron | 19.30 |
| 19 | ----do---- | 7.62 | Lead | 14.16 |
| 20 | Sec. hexamethylenediammoniumphosphite | 6.34 | Magnesium | 1.28 |
| 21 | Prim. hexamethylenediammoniumphosphite | 8.97 | ----do---- | 2.56 |
| 22 | Sec. hexamethylenediammoniumphosphite | 6.34 | Iron | 9.65 |
| 23 | Prim. hexamethylenediammoniumphosphite | 8.97 | ----do---- | 19.30 |
| 24 | Sec. dipropylenetriammoniumphosphite | 5.55 | Magnesium | 1.28 |
| 25 | Prim. dipropylenetriammoniumphosphite | 8.09 | ----do---- | 2.56 |
| 26 | Sec. dipropylenetriammoniumphosphite | 5.55 | Lead | 7.08 |
| 27 | Prim. dipropylenetriammoniumphosphite | 8.09 | ----do---- | 14.16 |
| 28 | Prim./sec. mixture tetraethylenepentammoniumphosphite | 7.67 | Cadmium | 6.25 |
| 29 | Prim. N,N'-dipropionitrilethylene-di-ammoniumphosphite | 10.0 | Magnesium | 3.84 |

Figure 3:
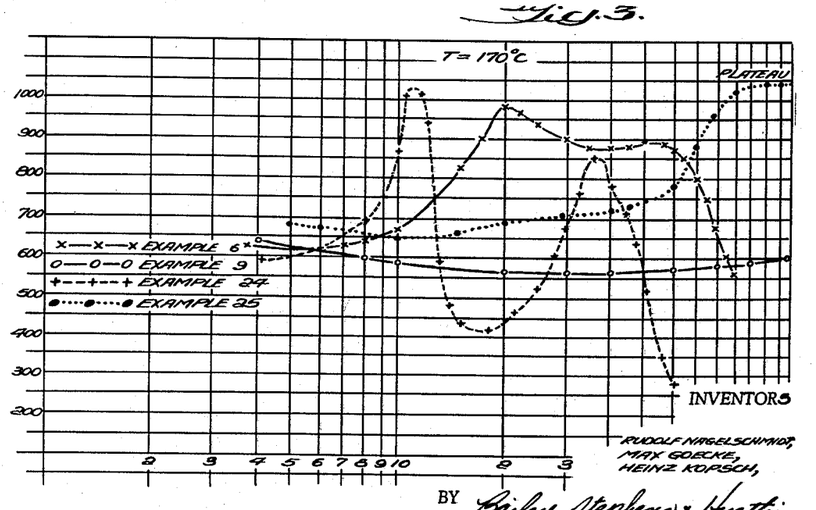
Figure 4:
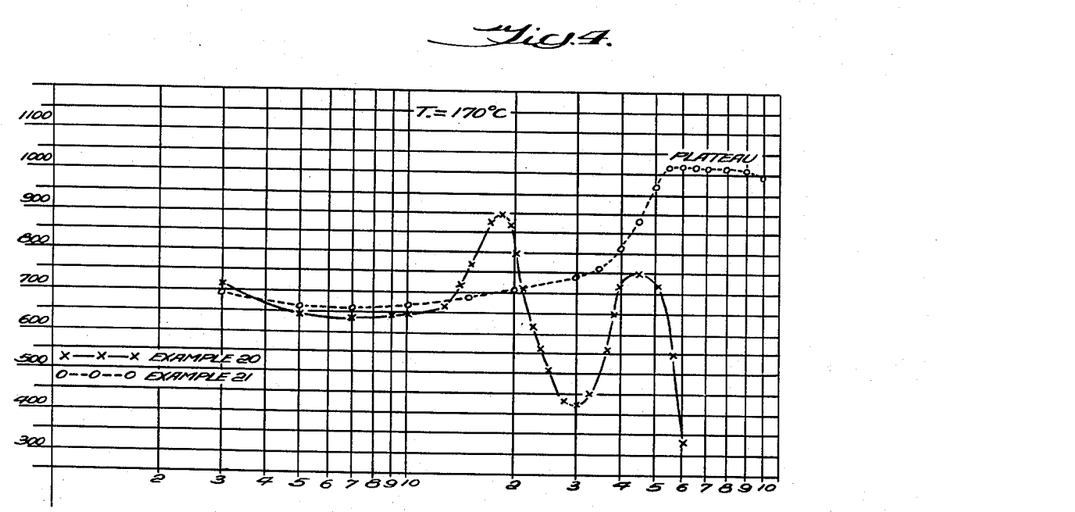
Figure 5:
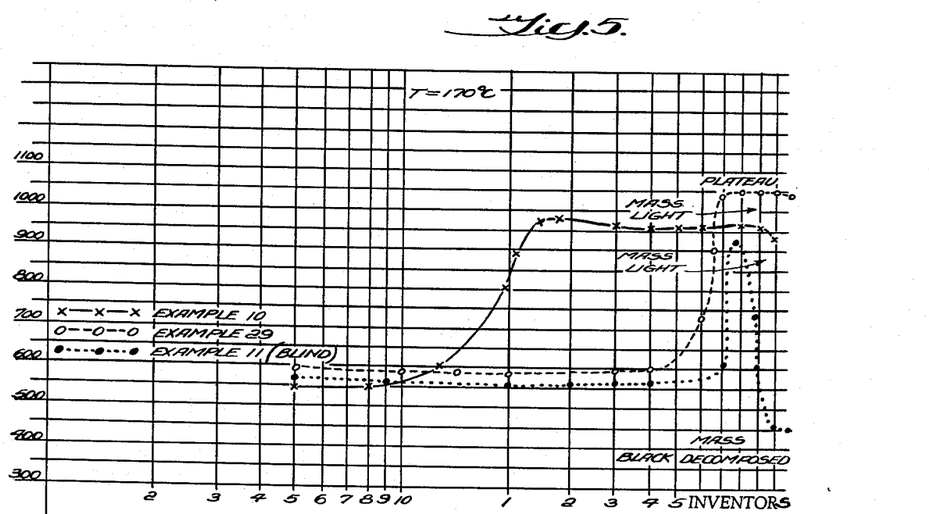

FIGS. 3–5 of the drawings show the criterion of the reaction which occurred in several of the examples given in Tables 1 and 2. At the same time representative characteristic differences between the types of the substances added are indicated. The criterion of the change of the polyvinyl chloride mass is the occurrence of one or more maxima in a time/work diagram taken with a Brabender plastograph at 165° C.

The use of only one polyvinyl chloride and only one plasticizer type without other additions outside several special reaction products of phosphorous acid with di- and polyamines in Tables 1 and 2 does not signify a limitation of the invention to the use of these substances but rather only shows that with different additions different actions can be attained. The examples given in the following Table 3 serve the same purpose in which a mixture of 80 parts of polyvinyl chloride and 20 parts plasticizer was used. In the examples of Table 3 the dioctyl adipate was partially or completely replaced with epoxy compounds. Also in this instance the criterion of the effectiveness of the process according to the invention was determined by test with the Brabender plastograph at 170° C. To simplify the evaluation Table 3 is not supplemented by actual graphs as was the case with Tables 1 and 2 but by indicating the running period until the first maximum was reached in the time/work diagram. If a maximum was not reached but rather a so-called plateau, the test was terminated after 200 minutes running time.

Table 3

| 1 | 2 | 3 | 4 | 5 | 6 | 7 | 8 | 9 |
|---|---|---|---|---|---|---|---|---|
| Example No. | Ammonium salts of phosphorous acid with di- and polyamines | Quantity in percent based on PVC | Plasticizer and/or epoxy compound | Quantity of plasticizer and/or epoxy compound | Oxide of Metal | Quantity of metal oxide | 1st max. after minutes running time | 2nd max.=+ Plateau= Pl. |
| 30 | Sec.-1,3-propylenediammoniumphosphite | 5 | dioctyladipate / Butylepoxystearate | 15 / 5 | | | 25 | Pl. |
| 31 | ----do---- | 5 | Dioctyladipate / Butylepoxystearate | 15 / 5 | Magnesium | 1.3 | 12 | Pl., + |
| 32 | ----do---- | 5 | Butylepoxystearate | 20 | Lead | 7.0 | 10 | Pl., + |
| 33 | Prim.-1,3-propylenediammoniumphosphite | 7.62 | Dioctyladipate / Butylepoxystearate | 15 / 5 | | | No maximum, very slow rise to plateau | |
| 34 | ----do---- | 7.62 | Dioctyladipate / Butylepoxystearate | 15 / 5 | Magnesium | 2.6 | 70 | Pl. |
| 35 | ----do---- | 7.62 | Butylepoxystearate | 20 | Lead | 14 | 22 | Pl. |
| 36 | ----do---- | 7.62 | ----do---- | 20 | ----do---- | 25 | 19.5 | Pl. |
| 37 | Sec.-1,3-propylenediammoniumphosphite | 5 | Isooctyl-9,10-epoxystearate | 20 | Magnesium | 1.3 | 16 | Pl., + |
| 38 | ----do---- | 5 | Allyl-epoxystearate | 20 | ----do---- | 1.3 | 11 | Pl., + |
| 39 | ----do---- | 5 | 2-ethyl-hexyl-epoxystearate | 20 | ----do---- | 1.3 | 18 | Pl., + |
| 40 | ----do---- | 5 | Butylepoxystearate | 20 | Magnesium / Iron | 1.3 / 9.6 | 8 | Pl., + |
| 41 | Sec.-dipropylenetriammoniumphosphite | 5.55 | Dioctyladipate / Butylepoxystearate | 15 / 5 | | | 20 | Pl. |
| 42 | ----do---- | 5.55 | Dioctyladipate / Butylepoxystearate | 15 / 5 | Magnesium | 2.6 | 11 | Pl., + |

Table 5

| Example No. | 67 | 68 | 69 | 70 | 71 | 71 | 73 | 74 | 75 | 76 | 77 | 78 | 79 | 80 | 81 | 82 |
|---|---|---|---|---|---|---|---|---|---|---|---|---|---|---|---|---|
| SUBSTANCES | | | | | | | | | | | | | | | | |
| Polyvinylchloride | 60 | 60 | 65 | 100 | 100 | 90 | 80 | 80 | 70 | 70 | 70 | 70 | 50 | 75 | 75 | 100 |
| Dioctyladipate | 40 | | 20 | | | | 20 | 20 | | | | | 20 | | | |
| Dioctylphthalate | | 40 | | | | 10 | | | 30 | 30 | 30 | 20 | 20 | 25 | 25 | |
| Tricresylphosphate | | | 20 | | | | | | | | | | 10 | | | |
| Butylepoxystearate | | 4 | 4 | 6 | 6 | | | 2 | | | | 4 | 5 | 5 | | 4 |
| Magnesium oxide | 4 | | | | 2 | | 2 | 2 | | | | | | | | |
| Cadmium oxide | 1 | | | | | | | | | | | | | | | |
| Lead oxide | | 6 | | | | | | | | | | 4 | 4 | | | |
| Iron oxide | | | 4.8 | | | | | | | | | | | | | |
| 1,2-propylenediammonium-phosphite | 2.6 | | | | | | 3.0 | 3.0 | | | | | | 4.0 | 4.0 | 4.3 |
| Hexamethylenediammonium-phosphite | | 3.2 | 3.2 | | | 0.8 | | | | | | | | | | |
| Dipropylenetriammonium-phosphite | | | | 1 | 1 | | | | 4.4 | 4.4 | 4.4 | 2.2 | 2.2 | | | |
| Ethylenediammoniumglycolesterphosphite | | | | 11.5 | 11.5 | 11.0 | | | | | | 6.8 | 6.8 | | | 8 |
| Diabenzalhexamethylenediamine | 2.0 | 1.8 | 0.5 | 2.2 | | | 2.6 | 2.6 | | 2.2 | 1.8 | | 3.4 | | 3.0 | 3.6 |
| Ethylenediammoniumxanthate | | 2.2 | 2.2 | | | | | | | | | | 1.2 | | | |
| Dimethylolpiperazine | | | 0.6 | | | 0.7 | | | | | | | | | | |
| Sulfur | | 1 | 0.5 | | | | | 0.8 | | | 0.8 | | | | 0.2 | |
| Toluylenediisocyanate | | | | | | | 0.9 | 0.9 | | | | | | | | |
| Cadmium-selenide | | | | | | 2.2 | | | | | | | | | 0.2 | |
| Dibutyltinmercaptide | 0.8 | | | | | | 0.4 | 0.4 | | | | | 0.6 | | | |
| Dibutyltinmaleate | | | | 1.0 | 1.0 | 0.7 | | | 0.9 | 0.9 | | | 0.6 | | | |
| Cadmium-barium-laurate | | | | | | | 0.6 | 0.6 | | | | 0.3 | 0.1 | | | |
| Naphthenic Mineral oil | 2 | | | 2 | 2 | 1.6 | | | | | | 0.3 | 3.5 | | | |
| Chalk | 5 | | | | | | | | 5.5 | 5.5 | | 2.8 | 2.8 | 30 | 30 | |
| Mica | | | | | | 2 | | | 0.5 | 0.5 | | | | 20 | 20 | |
| Active carbon black | | 6 | 6 | | | | | | | | 10 | 10 | | | | |
| Silicon dioxide produced in gas phase | 0.5 | | | | | | 0.2 | 0.2 | 0.5 | 0.5 | | | 0.1 | | | 16 |
| Azoisobutyric acid-dinitrile | | | | | | | | | | | | | 12 | | | |
| Pigment | 2 | | | 2 | 2 | | 1.5 | 1.5 | 2.0 | 2.0 | | | 0.4 | 6 | 6 | |
| Alteration in properties as against controls | + | + | + | + | + | + | + | + | + | + | + | + | + | + | + | + |

Table 6

| Example No. | 83 | 84 | 85 | 86 | 87 | 88 | 89 | 90 | 91 | 92 | 93 | 94 | 95 | 96 | 97 |
|---|---|---|---|---|---|---|---|---|---|---|---|---|---|---|---|
| SUBSTANCES | | | | | | | | | | | | | | | |
| Polyvinylidene chloride | 80 | | | | | | | | | | | | | | |
| Polyvinylbromopropionate | | 95 | | | | | | | | | | | | | |
| Polychloroethylacrylate | | | 100 | | | | | | | | | | | | |
| Poly-α-chlorostyrene | | | | 100 | | | | | | | | | | | |
| Chlorinated rubber | | | | | 80 | | | | | | | | | | |
| Polychloroprene | | | | | | 100 | 95 | | | | | | | | |
| Chlorosulfonated polyethylene | | | | | | | | 100 | 100 | 90 | | | | | |
| Chlorosulfonated polypropylene | | | | | | | | | | | 100 | 90 | | | |
| Chlorobutyl rubber | | | | | | | | | | | | | 100 | 90 | |
| Polytrifluorochloroethylene | | | | | | | | | | | | | | | 98 |
| Sec. hexamethylenediammoniumphosphite | 6.7 | | | | | | 4.0 | | | | | 4.9 | | | |
| Dipropylenetriammoniumphosphite | 0.3 | | | 3.7 | | 5.5 | | | 6.2 | | | 2.0 | | 3.6 | |
| Pb-salt of prim. hexamethylenediammonium-phosphite | | | 7.7 | | | 8.4 | | | | 6.6 | | 5.9 | 1.1 | | 8.2 |
| Hexamethylenediammonium-di-ethylhexylester-phosphite | | | | 8.4 | 10.6 | | | | | 16.4 | | 8.2 | | 1.2 | |
| Dibenzalhexamethylenediamine | | 0.4 | | | | | 2.0 | | | | 0.3 | | 0.3 | 1.3 | |
| 2-mercaptobenzothiazole | | 0.3 | | | | | | | | | 0.7 | | 0.6 | 0.4 | 0.5 |
| Sulfur | | 0.5 | | | | | | | | | 0.9 | | 1.0 | 0.6 | 0.8 |
| Active gas black | | 6 | | | | | | | | 20 | | 10 | | 30 | |
| Vapor phase silicon dioxide | | | | | | 1.8 | | 10 | 20 | | | | 4.3 | | 3.0 |
| Pigment | 0.3 | | | 0.5 | | 6.5 | | 4 | 8 | 10 | | | 2.5 | | |
| Magnesium oxide | 0.4 | | | 0.5 | | 0.9 | 2.8 | 30 | 50 | 6 | | 2 | 7.3 | | 4.9 |
| Zinc oxide | | | | | 0.4 | | | | | | 5 | | | 4 | |
| Butylepoxystearate | | | | | 1.1 | 10 | | 5 | | | 10 | 4 | 2.4 | | |
| Naphthenic oil | 5 | 5 | | | | | 4 | | 6 | | | 1 | | 5 | 2 |
| Dioctyladipate | 15 | | | | 10 | | | | | | | | | 5 | |
| Alterations in properties as against control | + | + | + | + | + | + | + | + | + | + | + | + | + | + | + | in influencing the properties of the shaped bodies. In the preferred procedure in which the reaction agents are mixed with the polymeric mass before shaping, the reaction occurs during subsequent heating which may occur during the shaping operation.

Table 6 contains examples illustrating effectiveness of the process according to the invention on halogen containing polymers other than polyvinyl chloride.

Table 7 contains examples illustrating the effectiveness of the process according to the invention on mixtures of halogen containing polymers.

Table 8 contains examples illustrating the effectiveness of the process according to the invention on copolymers of halogen containing monomers.

The quantity of plasticizer which can be used in the scope of the invention may vary from 0 up to 150% by weight, with reference to the halogen containing thermoplastic polymer, preferably in quantities of 10 to 75% by weight.

Table 3—Continued

| 1 | 2 | 3 | 4 | 5 | 6 | 7 | 8 | 9 |
|---|---|---|---|---|---|---|---|---|
| Example No. | Ammonium salts of phosphorous acid with di- and polyamines | Quantity in percent based on PVC | Plasticizer and/or epoxy compound | Quantity of plasticizer and/or epoxy compound | Oxide of Metal | Quantity of metal oxide | 1st max. after minutes running time | 2nd max.=+ Plateau= Pl. |
| 43 | Sec.-dipropylenetriammonuim-phosphite. | 5.55 | Butylepoxystearate | 20 | Lead | 7.0 | 8 | + |
| 44 | ——do—— | 5.55 | ——do—— | 20 | Aluminum | 1.7 | 20 | Pl. flat + |
| 45 | ——do—— | 5.55 | Allylepoxystearate | 20 | Lead | 7.0 | 7.5 | + |
| 46 | Prim./sec. (80/20) mixture tetra-ethylenepentammonium-phosphite. | 7.7 | Butylepoxystearate | 20 | | | 22 | Pl. |
| 47 | ——do—— | 7.7 | ——do—— | 20 | Magnesium | 2.6 | 8 | Pl., + |
| 48 | Prim./sec. mixture tetraethyl-enepentammoniumphosphite and prim. N,N'-dipropioni-trile-ethylene-di-ammonium-phosphite. | 4.3 / 5.0 | ——do—— | 20 | | | 15 | Pl. |
| 49 | Prim./sec. mixture tetraethyl-enepentammoniumphosphite and prim. N,N'-dipropioni-trile-ethylene-di-ammonium-phosphite. | 5.0 / 5.0 | ——do—— | 20 | Tin | 5.8 | 13.5 | Pl., + |
| 50 | Control | | ——do—— | 20 | ——do—— | 5.8 | | |

A number of further examples using a series of other reaction products of di- and polyamines with phosphorous acids are given in Table 4 and in Table 5 a number of examples are given in which other substances which can be used according to the invention are employed. The numerals in these and the following tables signify parts by weight. The last column in each table indicates whether or not an alteration in the properties of the polymer composition occurred in comparison to control compositions omitting the phosphorous acid compounds employed according to the invention. Such alteration concerns the total or partial elimination of the thermoplasticity of the starting polymers, the practical insolubility of the altered polymers, the improvement in stability against influences of heat and light, the previously mentioned improvement behavior under torsion, the tearing strength and the like.

Again, reference is made to the fact that, while it is preferably according to the invention to admix the reaction agents derived from phosphorous compounds with the polymeric mass before it is shaped, it is also generally possible to apply such reaction agents to finished shaped bodies even though the latter procedure has the disadvantages of difficult dosability and the lower latitude Table 4

| Example No. | 51 | 52 | 53 | 54 | 55 | 56 | 57 | 58 | 59 | 60 | 61 | 62 | 63 | 64 | 65 | 66 |
|---|---|---|---|---|---|---|---|---|---|---|---|---|---|---|---|---|
| SUBSTANCES | | | | | | | | | | | | | | | | |
| I. Reaction products of di- and polyamines with phosphorous acids: | | | | | | | | | | | | | | | | |
| Sec. hexamethylenediammonium-phosphite | 4.1 | | | | | | | | | | | | | 2.2 | | |
| Magnesium salt of prim. hexa-methylenediammoniumphosphite | | 5.5 | | | | | | | | | | | | | 2.8 | 3.8 |
| Hexamethylene-1-ammonium-6-amido-phosphite | | | 4.2 | | | | | | | | | | | | | |
| Hexamethylene-1,6-diamide of phosphorous acid | | | | 6.2 | | | | | | | | | | | | 2.2 |
| Salt of metaphosphenous acid and hexamethylenediamine | | | | | 2.4 | | | | | | | | | | | |
| Salt of polymeric phosphorous acid and hexamethylenediamine | | | | | | 4.8 | | | | | | 12 | 12 | 8 | 8 | |
| Hexamethylenediammonium-di-2-ethylhexylesterphosphite | | | | | | | | 14.5 | | | | | | 10 | 10 | |
| Hexamethylenediammonium-glycol-esterphosphite | | | | | | | | | 21 | 21 | | | | | | |
| 1,2-glycolester-1,6-hexamethylenedi-amide of phosphorous acid | | | | | | | | | | | 24 | | | | | |
| 1,2-propylenediammoniumphosphite | | | | | | | | | | | | 2.9 | 2 | 2 | | |
| II. Type of polyvinyl chloride: | | | | | | | | | | | | | | | | |
| Emulsion—K-value-70 | 70 | | | 80 | | | | | | 85 | 50 | | | | | 60 |
| Suspension—K-value-70 | | 70 | | | 60 | | 100 | | | | | | | | | |
| Suspension—K-value-80 | | | 65 | | | | | 90 | 90 | | | 75 | 75 | 100 | 100 | |
| Bulk polymer—K-value-50 | | | | | | 70 | | | | | | | | | | 10 |
| III. Plasticizer: | | | | | | | | | | | | | | | | |
| Dioctyladipate | 28 | | 15 | | 40 | | | 10 | 10 | | 35 | 20 | 20 | | | 30 |
| Dioctylphthalate | | 25 | 10 | | | | | | | 10 | | | | | | |
| Tricresylphosphate | | | 5 | | | | 30 | | | | | | | | | |
| Triphenylphosphite | 2 | | | | | | | | | | | 5 | 5 | | | |
| Di-nonylsebacate | | | | 20 | | | | | | | | | | | | |
| IV. Epoxy compounds: | | | | | | | | | | | | | | | | |
| Butylepoxystearate | | | 2.5 | 4 | | | | | | | 5 | 15 | | | | |
| Allylepoxystearate | 2 | | 2.5 | | | | 6 | 6 | | | | | 2 | | | |
| 2-ethyl-hexyl-epoxy-tallate | | 5 | | | | | | | | | | | | 5 | 5 | |
| V. Oxides of Metal: | | | | | | | | | | | | | | | | |
| Magnesium | | | | | | | | | | 2 | | | | | | 2 |
| Barium | | | | | 2.4 | | | | | | | | | | | |
| Cadmium | 3.6 | | | | | | | | | | | | | | | |
| Lead | | | | | | | | | | | | | 5 | | | |
| Zinc | | | | | | | | | | | | | | 7.5 | | |
| Aluminum | | | | | | | | | 9 | | | | | | | |
| Iron | | | 4.5 | 4.5 | | | | | | | | | | | | 3.5 |
| Alteration in properties as compared to controls: | | | | | | | | | | | | | | | | |
| Alteration in properties as against controls = +, no alteration = — | + | + | + | + | + | + | + | + | + | + | + | + | + | + | + | + |

Table 3—Continued

| 1 | 2 | 3 | 4 | 5 | 6 | 7 | 8 | 9 |
|---|---|---|---|---|---|---|---|---|
| Example No. | Ammonium salts of phosphorous acid with di- and polyamines | Quantity in percent based on PVC | Plasticizer and/or epoxy compound | Quantity of plasticizer and/or epoxy compound | Oxide of Metal | Quantity of metal oxide | 1st max. after minutes running time | 2nd max.=+ Plateau= Pl. |
| 43 | Sec.-dipropylenetriammonuim-phosphite. | 5.55 | Butylepoxystearate | 20 | Lead | 7.0 | 8 | + |
| 44 | ___do___ | 5.55 | ___do___ | 20 | Aluminum | 1.7 | 20 | Pl. flat + |
| 45 | ___do___ | 5.55 | Allylepoxystearate | 20 | Lead | 7.0 | 7.5 | + |
| 46 | Prim./sec. (80/20) mixture tetraethylenepentammonium-phosphite. | 7.7 | Butylepoxystearate | 20 | | | 22 | Pl. |
| 47 | ___do___ | 7.7 | ___do___ | 20 | Magnesium | 2.6 | 8 | Pl., + |
| 48 | Prim./sec. mixture tetraethylenepentammoniumphosphite and prim. N,N'-dipropionitrile-ethylene-di-ammonium-phosphite. | 4.3 / 5.0 | ___do___ | 20 | | | 15 | Pl. |
| 49 | Prim./sec. mixture tetraethylenepentammoniumphosphite and prim. N,N'-dipropionitrile-ethylene-di-ammonium-phosphite. | 5.0 / 5.0 | ___do___ | 20 | Tin | 5.8 | 13.5 | Pl., + |
| 50 | Control | | ___do___ | 20 | ___do___ | 5.8 | | |

A number of further examples using a series of other reaction products of di- and polyamines with phosphorous acids are given in Table 4 and in Table 5 a number of examples are given in which other substances which can be used according to the invention are employed. The numerals in these and the following tables signify parts by weight. The last column in each table indicates whether or not an alteration in the properties of the polymer composition occurred in comparison to control compositions omitting the phosphorous acid compounds employed according to the invention. Such alteration concerns the total or partial elimination of the thermoplasticity of the starting polymers, the practical insolubility of the altered polymers, the improvement in stability against influences of heat and light, the previously mentioned improvement behavior under torsion, the tearing strength and the like.

Again, reference is made to the fact that, while it is preferably according to the invention to admix the reaction agents derived from phosphorous compounds with the polymeric mass before it is shaped, it is also generally possible to apply such reaction agents to finished shaped bodies even though the latter procedure has the disadvantages of difficult dosability and the lower latitude Table 4

| Example No | 51 | 52 | 53 | 54 | 55 | 56 | 57 | 58 | 59 | 60 | 61 | 62 | 63 | 64 | 65 | 66 |
|---|---|---|---|---|---|---|---|---|---|---|---|---|---|---|---|---|
| SUBSTANCES | | | | | | | | | | | | | | | | |
| I. Reaction products of di- and polyamines with phosphorous acids: | | | | | | | | | | | | | | | | |
| Sec. hexamethylenediammonium-phosphite | 4.1 | | | | | | | | | | | | | 2.2 | | |
| Magnesium salt of prim. hexamethylenediammoniumphosphite | | 5.5 | | | | | | | | | | | | | 2.8 | 3.8 |
| Hexamethylene-1-ammonium-6-amido-phosphite | | | 4.2 | | | | | | | | | | | | | |
| Hexamethylene-1,6-diamide of phosphorous acid | | | | 6.2 | | | | | | | | | | | | 2.2 |
| Salt of metaphosphenous acid and hexamethylenediamine | | | | | 2.4 | | | | | | | | | | | |
| Salt of polymeric phosphorous acid and hexamethylenediamine | | | | | | 4.8 | | | | | | 12 | 12 | 8 | 8 | |
| Hexamethylenediammonium-di-2-ethylhexylesterphosphite | | | | | | | 14.5 | | | | | | | 10 | 10 | |
| Hexamethylenediammonium-glycolesterphosphite | | | | | | | | 21 | 21 | | | | | | | |
| 1,2-glycolester-1,6-hexamethylenediamide of phosphorous acid | | | | | | | | | | 24 | | | | | | |
| 1,2-propylenediammoniumphosphite | | | | | | | | | | | 2.9 | 2 | 2 | | | |
| II. Type of polyvinyl chloride: | | | | | | | | | | | | | | | | |
| Emulsion—K-value-70 | 70 | | | 80 | | | | | | 85 | 50 | | | | | 60 |
| Suspension—K-value-70 | | 70 | | | 60 | | 100 | | | | | | | | | |
| Suspension—K-value-80 | | | 65 | | | | | 90 | 90 | | | 75 | 75 | 100 | 100 | |
| Bulk polymer—K-value-50 | | | | | | 70 | | | | | | | | | | 10 |
| III. Plasticizer: | | | | | | | | | | | | | | | | |
| Dioctyladipate | 28 | | 15 | | 40 | | | 10 | 10 | | 35 | 20 | 20 | | | 30 |
| Dioctylphthalate | | 25 | 10 | | | | | | | 10 | | | | | | |
| Tricresylphosphate | | | 5 | | | 30 | | | | | | | | | | |
| Triphenylphosphite | 2 | | | | | | | | | | | | 5 | 5 | | |
| Di-nonylsebacate | | | | 20 | | | | | | | | | | | | |
| IV. Epoxy compounds: | | | | | | | | | | | | | | | | |
| Butylepoxystearate | | | 2.5 | 4 | | | | | | 5 | 15 | | | | | |
| Allylepoxystearate | 2 | | 2.5 | | | | | 6 | 6 | | | | 2 | | | |
| 2-ethyl-hexyl-epoxy-tallate | | 5 | | | | | | | | | | | | 5 | 5 | |
| V. Oxides of Metal: | | | | | | | | | | | | | | | | |
| Magnesium | | | | | | | | | | 2 | | | | | | 2 |
| Barium | | | | | 2.4 | | | | | | | | | | | |
| Cadmium | 3.6 | | | | | | | | | | | | | | | |
| Lead | | | | | | | | | | | 5 | | | | | |
| Zinc | | | | | | | | | | | | | 7.5 | | | |
| Aluminum | | | | | | | | | 9 | | | | | | | |
| Iron | | | 4.5 | 4.5 | | | | | | | | | | | | 3.5 |
| Alteration in properties as compared to controls: | | | | | | | | | | | | | | | | |
| Alteration in properties as against controls = +, no alteration = − | + | + | + | + | + | + | + | + | + | + | + | + | + | + | + | + |

Table 5

| Example No. | 67 | 68 | 69 | 70 | 71 | 71 | 73 | 74 | 75 | 76 | 77 | 78 | 79 | 80 | 81 | 82 |
|---|---|---|---|---|---|---|---|---|---|---|---|---|---|---|---|---|
| SUBSTANCES | | | | | | | | | | | | | | | | |
| Polyvinylchloride | 60 | 60 | 65 | 100 | 100 | 90 | 80 | 80 | 70 | 70 | 70 | 70 | 50 | 75 | 75 | 100 |
| Dioctyladipate | 40 | | 20 | | | | 20 | 20 | | | | | 20 | | | |
| Dioctylphthalate | | 40 | | | | | | | 30 | 30 | 30 | 20 | 20 | | | |
| Tricresylphosphate | | | 20 | | | 10 | | | | | | | 10 | 25 | 25 | |
| Butylepoxystearate | | 4 | 4 | 6 | 6 | | | 2 | | | | 5 | 5 | | | 4 |
| Magnesium oxide | 4 | | | | 2 | | 2 | 2 | | | 4 | | | | | |
| Cadmium oxide | 1 | | | | | | | | | | | | | | | |
| Lead oxide | | 6 | | | | | | | | | | 4 | 4 | | | |
| Iron oxide | | | 4.8 | | | | | | | | | | | | | |
| 1,2-propylenediammonium-phosphite | 2.6 | | | | | | 3.0 | 3.0 | | | | | | 4.0 | 4.0 | 4.3 |
| Hexamethylenediammonium-phosphite | | 3.2 | 3.2 | | | | | | | | | | | | | |
| Dipropylenetriammonium-phosphite | | | | 1 | 1 | 0.8 | | | 4.4 | 4.4 | 4.4 | 2.2 | 2.2 | | | |
| Ethylenediammoniumglycolesterphosphite | | | | 11.5 | 11.5 | 11.0 | | | | | | 6.8 | 6.8 | | | 8 |
| Diabenzalhexamethylenediamine | 2.0 | 1.8 | 0.5 | 2.2 | | | 2.6 | 2.6 | | 2.2 | 1.8 | | 3.4 | | 3.0 | 3.6 |
| Ethylenediammoniumxanthate | | 2.2 | 2.2 | | | | | | | | 1.2 | | | | | |
| Dimethylolpiperazine | | | 0.6 | | | 0.7 | | | | | | | | | 0.2 | |
| Sulfur | | 1 | 0.5 | | | | 0.8 | 0.8 | | | 0.8 | | | | | |
| Toluylenediisocyanate | | | | | | | 0.9 | 0.9 | | | | | | | | |
| Cadmium-selenide | | | | | | 2.2 | | | | | | | | | | |
| Dibutyltinmercaptide | 0.8 | | | | | | 0.4 | 0.4 | | | | | | | | |
| Dibutyltinmaleate | | | | 1.0 | 1.0 | 0.7 | | | 0.9 | 0.9 | | | | 0.6 | | |
| Cadmium-barium-laurate | | | | | | | 0.6 | 0.6 | | | | 0.3 | 0.3 | 0.1 | | |
| Naphthenic Mineral oil | 2 | | | 2 | 2 | 1.6 | | | | | | 2.8 | 2.8 | 3.5 | | |
| Chalk | 5 | | | | | | | | 5.5 | 5.5 | | | | | 30 | 30 |
| Mica | | | | | | 2 | | | 0.5 | 0.5 | | | | | 20 | 20 |
| Active carbon black | | 6 | 6 | | | | | | | | 10 | 10 | | | | |
| Silicon dioxide produced in gas phase | 0.5 | | | | | | 0.2 | 0.2 | 0.5 | 0.5 | | | 0.1 | | | |
| Azoisobutyric acid-dinitrile | | | | | | | | | | | | | 12 | | | 16 |
| Pigment | 2 | | | 2 | 2 | | 1.5 | 1.5 | 2.0 | 2.0 | | | 0.4 | 6 | 6 | |
| Alteration in properties as against controls | + | + | + | + | + | + | + | + | + | + | + | + | + | + | + | + |

Table 6

| Example No. | 83 | 84 | 85 | 86 | 87 | 88 | 89 | 90 | 91 | 92 | 93 | 94 | 95 | 96 | 97 |
|---|---|---|---|---|---|---|---|---|---|---|---|---|---|---|---|
| SUBSTANCES | | | | | | | | | | | | | | | |
| Polyvinylidene chloride | 80 | | | | | | | | | | | | | | |
| Polyvinylbromopropionate | | 95 | | | | | | | | | | | | | |
| Polychloroethylacrylate | | | 100 | | | | | | | | | | | | |
| Poly-α-chlorostyrene | | | | 100 | | | | | | | | | | | |
| Chlorinated rubber | | | | | 80 | | | | | | | | | | |
| Polychloroprene | | | | | | 100 | 95 | | | | | | | | |
| Chlorosulfonated polyethylene | | | | | | | | 100 | 100 | 90 | | | | | |
| Chlorosulfonated polypropylene | | | | | | | | | | | 100 | 90 | | | |
| Chlorobutyl rubber | | | | | | | | | | | | | 100 | 90 | |
| Polytrifluorochloroethylene | | | | | | | | | | | | | | | 98 |
| Sec. hexamethylenediammoniumphosphite | 6.7 | | | | | | 4.0 | | | | | | 4.9 | | |
| Dipropylenetriammoniumphosphite | 0.3 | | 3.7 | | 5.5 | | | 6.2 | | | 2.0 | | | 3.6 | |
| Pb-salt of prim. hexamethylenediammonium-phosphite | | 7.7 | | | | 8.4 | | | | 6.6 | | 5.9 | 1.1 | | 8.2 |
| Hexamethylenediammonium-di-ethylhexylester-phosphite | | | 8.4 | 10.6 | | | | | 16.4 | | 8.2 | | | 1.2 | |
| Dibenzalhexamethylenediamine | | 0.4 | | | | | 2.0 | | | 0.3 | | 0.3 | | 1.3 | |
| 2-mercaptobenzothiazole | | 0.3 | | | | | | | | 0.7 | | 0.6 | | 0.4 | 0.5 |
| Sulfur | | 0.5 | | | | | | | | 0.9 | | 1.0 | | 0.6 | 0.8 |
| Active gas black | | 6 | | | | 40.0 | | | | 20 | | 10 | | 30 | |
| Vapor phase silicon dioxide | | | | | 1.8 | | 10 | 20 | | | | | 4.3 | | 3.0 |
| Pigment | 0.3 | | 0.5 | | 6.5 | | 4 | 8 | 10 | | | | 2.5 | | |
| Magnesium, oxide | 0.4 | | 0.5 | | 0.9 | 2.8 | 30 | 50 | 6 | | 2 | | 7.3 | 4 | 4.9 |
| Zinc oxide | | | | 0.4 | | | | | | 5 | | 4 | | 4 | |
| Butylepoxystearate | 5 | 5 | | 1.1 | 10 | | 5 | | | 10 | | 1 | 2.4 | | |
| Naphthenic oil | | | | | | 4 | | 6 | | | | | | 5 | 2 |
| Dioctyladipate | 15 | | | | 10 | | | | | | | | | 5 | |
| Alterations in properties as against control | + | + | + | + | + | + | + | + | + | + | + | + | + | + | + | in influencing the properties of the shaped bodies. In the preferred procedure in which the reaction agents are mixed with the polymeric mass before shaping, the reaction occurs during subsequent heating which may occur during the shaping operation.

Table 6 contains examples illustrating effectiveness of the process according to the invention on halogen containing polymers other than polyvinyl chloride.

Table 7 contains examples illustrating the effectiveness of the process according to the invention on mixtures of halogen containing polymers.

Table 8 contains examples illustrating the effectiveness of the process according to the invention on copolymers of halogen containing monomers.

The quantity of plasticizer which can be used in the scope of the invention may vary from 0 up to 150% by weight, with reference to the halogen containing thermoplastic polymer, preferably in quantities of 10 to 75% by weight.

Table 7

| Example No. | 98 | 99 | 100 | 101 | 102 | 103 | 104 | 105 | 106 | 107 | 108 | 109 | 110 |
|---|---|---|---|---|---|---|---|---|---|---|---|---|---|
| SUBSTANCES | | | | | | | | | | | | | |
| Polyvinylchloride | 80 | 95 | 75 | | | 50 | 50 | 80 | 70 | 60 | | | |
| Polyvinylidenechloride | | | 25 | | | | | | | | | | |
| Chlorinated rubber | | | | 15 | 10 | | | | | | | | |
| Polychloroprene | | | | 85 | | | | | | | | | |
| Chlorosulfonated polyethylene | 20 | 5 | | | 70 | 50 | 50 | 20 | 30 | 40 | | | |
| Chlorosulfonated polypropylene | | | | | 20 | | | | | | 40 | 60 | 40 |
| Chlorobutyl rubber | | | | | | | | | | | 60 | 40 | 60 |
| Dioctyladipate | 40 | 35 | | | | 15 | 15 | 20 | 12 | 8 | | | |
| Dioctylphthalate | | 25 | 50 | | | | | | 4 | 4 | | | |
| 1,3-propylenediammoniumphosphite | 3.3 | 3.3 | | 2.1 | | | | 4.8 | 4.4 | 4.2 | 2.1 | 4.3 | |
| Tetraethylenepentammoniumphosphite | | | | | | 4.8 | 6.2 | | | | | | 5.5 |
| Aluminum salt of prim. tetraethylenepentammoniumphosphite | | 0.3 | 5.8 | | 3.6 | | | | | | 6.3 | 4.7 | |
| Dibenzalhexamethylenediamine | | 0.2 | | 0.9 | 1.3 | | | 2 | 2.2 | 2.4 | | | 0.4 |
| Thiuramdisulfide | | | | 2.0 | 1.6 | | | | 0.2 | 0.6 | | | 0.6 |
| Sulfur | | | | 1.0 | 0.8 | | | | | 0.3 | | | 15 |
| Active gas black | | | | 50 | 20 | | | 3 | 3 | 3 | | | |
| Gas phase silicon dioxide | | 1 | | | | | | 6 | 6 | 6 | 3 | 3 | |
| Calcium silicate | | | | | | 1 | 1 | 2 | 2 | 2 | 4 | 4 | |
| Pigment | | 4 | | | | 4.6 | 4.6 | | | | 2 | 2 | |
| Lead oxide | | | | 8 | 3.8 | | 2 | | | | | | |
| Iron oxide | | | | | 2.6 | | | | | | | | 2 |
| Magnesium oxide | 1.5 | | | | | 2 | | 10 | | | 5 | 5 | |
| Butylepoxystearate | | | 5 | | 6 | 10 | | 5 | | 5 | 8 | 4 | |
| Allyl-epoxystearate | | | | 10 | | | 10 | | | | | | |
| Paraffin | 2 | | 1 | | 0.8 | 3 | 3 | | | | | | |
| Dibutyltinmaleate | 1 | 1 | 1.2 | | | 0.5 | 0.5 | | | | | | |
| Alterations in properties as against control | + | + | + | + | + | + | + | + | + | + | + | + | + |

Table 8

| Example No. | 111 | 112 | 113 | 114 | 115 | 116 | 117 | 118 | 119 | 120 | 121 | 122 |
|---|---|---|---|---|---|---|---|---|---|---|---|---|
| SUBSTANCES | | | | | | | | | | | | |
| Copolymer of vinylchloride(80)-vinylidenechloride(20) | 80 | 90 | | | | | | | | | | |
| Copolymer of vinylchloride(90)-vinylacetate(10) | | | 80 | 90 | | | | | | | | |
| Copolymer of vinylchloride(98)-vinylidenechloride(2) | | | | | 80 | 90 | | | | | | |
| Copolymer of ethylacrylate(95)-chloroprene(5) | | | | | | | 100 | 90 | | | | |
| Copolymer of vinylidenefluoride/hexafluoro-propylene | | | | | | | | | 100 | 100 | | |
| Chlorosulfonated copolymer of ethylene and propylene | | | | | | | | | | | 100 | 90 |
| 3,4-dihydroxy-hexamethylene-diammonium-diphosphite | | | | | | | 8.3 | 7.2 | | | 5.8 | 5.2 |
| N,N',N''-triethyl-di-propylenetriammonium-pyrophosphite | 6.4 | 6.0 | 5.8 | 5.3 | 5.5 | 5.1 | | | 3.3 | | | 0.2 |
| Calcium-1,3-propylenediammonium-diphosphite | | 0.4 | | 0.4 | | 0.4 | | 0.3 | 3.3 | 6.6 | 0.3 | 0.3 |
| Dioctyladipate | | | 5 | | 10 | | | 4 | | | | 3 |
| Dibutylphthalate | 20 | | 15 | | 10 | | | | | | | |
| Decyl-epoxy-tetra-hydrophthalate | 2 | 10 | 2 | 10 | 2 | 10 | | 6 | | | | 7 |
| Cadmium oxide | 2.1 | 1.8 | 2.1 | 1.8 | 2.1 | 1.8 | | | | | | 3 |
| Iron(3)oxide | | | | | | | 2 | 2 | 8 | 6 | | |
| Calcium oxide | | | | | | | 0.5 | 0.5 | 2 | 4 | 2 | |
| Active gas black | | | | | | | 20 | 20 | | | 25 | |
| Gas phase silicon dioxide | | | | | | | | | 5 | 5 | | 6 |
| Pigments | 2 | 2 | 2 | 2 | 2 | 2 | | | | | | 3 |
| Alterations in properties as against control | + | + | + | + | + | + | + | + | + | + | + | + |

We claim:

1. A process for altering the properties of polymeric materials selected from the group consisting of thermoplastic halogen containing polymers, co-polymers obtained from at least one monomeric halogen containing component which forms thermoplastic halogen containing homopolymers and polymer mixtures containing a polymer obtained from at least one monomeric halogen containing component which forms thermoplastic halogen containing homopolymers, said halogen in said polymeric materials being chemically bonded in the molecules of said polymeric materials and being selected from the group consisting of chlorine, fluorine and bromine which comprises reacting such polymeric materials at a temperature from 80 to 250° C. with at least one phosphorus compound selected from the group consisting of a reaction product (A) of a phosphorous compound ($A_1$) selected from the group consisting of monomeric and polymeric phosphorous acids and their partial esters with alcohols containing up to 18 carbon atoms with a polyamine ($A_2$) at least two nitrogen atoms of the amino groups of which each still carry at least one hydrogen atom and the metal salts (D) of such a primary reaction product (A) with a multivalent metal selected from the group consisting of magnesium, calcium, barium, zinc, aluminum, tin, lead, titanium, cadmium and iron.

2. The process of claim 1 in which the starting materials $A_1$ and $A_2$ for reaction product A are reacted with such polymeric materials.

3. The process of claim 1 in which the polyamines $A_2$ contain a chain selected from the group consisting of uninterrupted carbon chains containing 2 to 18 carbon atoms and carbon chains containing 2 to 18 carbon atoms interrupted by heteroatoms selected from the group consisting of oxygen, sulfur, nitrogen and phosphorus in which chains the remaining valences of the carbon atoms are satisfied by a member selected from the group consisting of hydrogen and aliphatic, aromatic, araliphatic and cycloaliphatic hydrocarbon radicals of up to 18 carbon atoms and such radicals containing heteroatoms selected from the group consisting of oxygen, sulfur, nitrogen and phosphorus.

4. The process of claim 1 in which said reaction product (A) is a compound of the type selected from the group consisting of ammonium salts of said phosphorous compound ($A_1$) and said polyamine ($A_2$), said metal salts (D), amides of said phosphorous compound ($A_1$) and said polyamine ($A_2$) and transition compounds of said phosphorous compound ($A_1$) and said polyamine ($A_2$) containing both and —$ONH_2R'R''$ groups derived from the amine groups of said polyamine on the phosphorus atom.

5. The process of claim 1 in which said phosphorus compound is reacted with said polymeric material in the presence of at least one substance selected from the group consisting of monofunctional epoxy compounds the oxirane oxygen of which is bonded to carbon atoms which in turn are bonded to at least one further carbon atom and oxides of the metals magnesium, calcium, barium, zinc, aluminum, tin, lead, titanium, cadmium and iron.

6. The process of claim 1 in which said phosphorus compound is a metal salt (D) and is employed in a quantity of 0.1 to 25% by weight with reference to the halogen containing thermoplastic polymer.

7. The process of claim 1 in which said phosphorus compound is a metal salt (D) and is employed in a quantity of 0.5 to 15% by weight with reference to the halogen containing thermoplastic polymer.

8. The process of claim 1 in which said phosphorus compound is a reaction product (A) of a phosphorous acid and a polyamine and is employed in a quantity of 0.01 to 22% by weight with reference to such halogen containing thermoplastic polymer.

9. The process of claim 1 in which said phosphorus compound is a reaction product (A) of a phosphorous acid and a polyamine and is employed in a quantity of 0.5 to 12% by weight with reference to such halogen containing thermoplastic polymer.

10. The process of claim 1 in which said phosphorus compound is a reaction product of a partial ester of a phosphorous acid and a polyamine and is employed in a quantity of 1 to 50% by weight with reference to such halogen containing thermoplastic polymer.

11. The process of claim 1 in which said phosphorus compound is a reaction product of a partial ester of a phosphorous acid and a polyamine and is employed in a quantity of 4 to 25% by weight with reference to such halogen containing thermoplastic polymer.

12. The process of claim 1 in which said phosphorus compound is reacted with said polymeric material in the presence of up to 150% by weight with reference to such polymeric material of a monofunctional epoxy compound the oxirane oxygen of which is bonded to carbon atoms which in turn are bonded to at least one further carbon atom.

13. The process of claim 1 in which said phosphorus compound is reacted with said polymeric material in the presence of up to 100% by weight with reference to such polymeric material of an oxide of a metal selected from the group consisting of magnesium, calcium, barium, zinc, aluminum, tin, lead, titanium, cadmium and iron.

14. The process of claim 1 in which said heat treatment is carried out at 100 to 215° C.

15. The process of claim 1 in which the thermoplastic halogen containing polymer is admixed with the phosphorus compound and a heat activatable, said mixture is heated to a temperature sufficient to activate the blowing agent to foam the mixture and to a temperature sufficient to cause the reaction between the polymer and the phosphorus compound.

16. The process of claim 1 in which the starting compounds for the metal salt (D) of said reaction product (A) with multivalent metals are reacted with the polymeric materials.

17. A composition of matter comprising a polymeric material selected from the group consisting of thermoplastic halogen containing polymers, co-polymers obtained from at least one monomeric halogen containing component which forms thermoplastic halogen containing homopolymers and polymer mixtures containing a polymer obtained from at least one monomeric halogen containing component which forms thermoplastic halogen containing homopolymers, said halogen in said polymeric material being chemically bonded in the molecules of said polymeric material and being selected from the group consisting of chlorine, fluorine and bromine and at least one phosphorus compound selected from the group consisting of a reaction product (A) of a phosphorous compound ($A_1$) selected from the group consisting of monomeric and polymeric phosphorous acids and their partial esters with alcohols containing up to 18 carbon atoms with a polyamine ($A_2$) at least two nitrogen atoms of the amino groups of which each still carry at least one hydrogen atom and the metal salts (D) of such a primary reaction product (A) with a multivalent metal selected from the group consisting of magnesium, calcium, barium, zinc, aluminum, tin, lead, titanium, cadmium and iron.

18. A composition of matter according to claim 17 in addition comprising up to 150% by weight of a plasticizer for said polymeric material with reference to said polymeric halogen containing material.

19. A composition of matter according to claim 17 in addition comprising up to 10 to 75% by weight of a plasticizer for said polymeric material with reference to said polymeric halogen containing material.

20. A composition of matter according to claim 17 in which said polymeric material is polyvinyl chloride.

21. The process of claim 1 in which said phosphorus compound is an acid reaction product (A) and such compound is reacted in the presence of at least one substance selected from the group consisting of monofunctional epoxy compounds the oxirane oxygen of which is bonded to carbon atoms which in turn are bonded to at least one further carbon atoms and oxides of the metals magnesium, calcium, barium, zinc, aluminum, tin, lead, titanium, cadmium and iron.

References Cited by the Examiner

FOREIGN PATENTS 1,237,962 6/60 France.
1,239,481 7/60 France.

OTHER REFERENCES

Zimmerman et al.: Rubber Age, vol. 68, pp. 311–8, Dec. 1950.

Derwent Belgium Patent Report:
    May 1960, vol. 65A, page A20, Belgium 586,583.
    May 1960, vol. 67A, page A6, Belgium 588,269.
    May 1960, vol. 67A, page A7, Belgium 588,270.
    Sept. 1960, vol. 69B, page C6, Belgium 588,271.

JOSEPH L. SCHOFER, *Primary Examiner.*

LOUISE P. QUAST, WILLIAM H. SHORT, *Examiners.*